Sept. 4, 1962 F. J. HOOVEN 3,052,313
VEHICULAR POWER PLANT
Filed July 15, 1959 3 Sheets-Sheet 3

FREDERICK J. HOOVEN
INVENTOR.
BY John L. Faulkner
John J. Roethel
ATTORNEYS

United States Patent Office 3,052,313
Patented Sept. 4, 1962

3,052,313
VEHICULAR POWER PLANT
Frederick J. Hooven, Bloomfield Hills, Mich., assignor to Ford Motor Company, Dearborn, Mich., a corporation of Delaware
Filed July 15, 1959, Ser. No. 827,243
4 Claims. (Cl. 180—55)

This invention relates to motor vehicles and more particularly to an improved construction and arrangement in which the engine, transmission and differential are combined into a single unit, the combination unit preferably being mounted at the front of the vehicle and driving the front wheels.

The continuation of the trend in motor vehicle design, by which the vertical exterior height of the vehicle body has been drastically reduced, has presented the engine and driveline engineers with a difficult problem to solve. The interior height of the vehicle has been maintained by lowering the floor pan as the roof has been lowered. However, it has not been possible to lower the driveline between the engine and the rear axle differential to the same extent. The result has been that the driveline tunnel through the center of the vehicle has become increasingly noticeable and relatively more space consuming.

The problem has long been recognized but has only in recent years become really acute. A general solution for the problem can be readily found in the prior art. That is, the driveshaft, as it is conventionally known, may be eliminated by having a front mounted engine driving the front wheels of the vehicle or having a rear mounted engine driving the rear wheels of the vehicle, both types of drives being included in a class that will be referred to as a "power unit drive."

The present invention is directed toward improvement in power unit drive vehicles and their power plants. Although power unit drives are well known to the prior art both in front and rear wheel drive forms, the constructions and arrangements are such that the overall height and length of the units, including the engine and means for power transmission to the driving wheel, are such that the unit cannot be incorporated in present front engine compartments due to space limitations. Even now, the conventional vehicle with all its accessories, but not including the power transmission means, leaves very little space within the engine compartment. Prior power drive units are not adaptable to rear engine compartments because of their undesirable over-all height. Also, most existing designs of power unit require that the engine be mounted completely forward of or behind the driving wheels. In such designs the weight of the power plant, being well removed from the supporting force of the wheels, places large bending moments on the structure of the vehicle. When the wheels pass over irregularities in the road, the resulting variations in the vertical forces at the wheel causes undesirable vibrations in the vehicle structure, requiring extra cost and weight to be incorporated in the structure of the car to obtain smoothness of ride.

It is an object of the present invention to provide a power unit having an over-all height substantially the same as conventional engines used in current front engine rear wheel drive vehicles. It is a further object to provide a power unit having an over-all length substantially equal to that of the engines of conventional front engine rear drive vehicles. It is a still further object of this invention to provide a power unit in which the longitudinal position of the mass of the engine is substantially coincident with the axis of the driving wheels.

In the illustrated embodiment of the invention the engine is mounted at the front of the car but is moved laterally to one side of the longitudinally extending plane containing the vehicle center line in order to permit installation of the transmission and differential along one side and parallel to the engine. Power is transmitted at the rear of the engine through a transfer drive unit to an integral torque converter and transmission unit mounted on the rear end of the transmission differential unit.

An important feature of the present invention relates to the cross shaft from the differential unit for driving the half shaft through which power is transmitted to one of the wheels on the other side of the vehicle engine. In the illustrated embodiment of the invention, the cross shaft passes through the oil pan under a main bearing cap and has at least a portion thereof lying within the projected area of the sweep of the crank arms of the crankshaft as the latter rotates. The wheels are driven by independently suspended half shafts. The shafts have Cardan joints at the input ends and constant velocity joints at the wheels.

Other objects and advantages of this invention will be made more apparent as this description proceeds, particularly when considered in connection with the accompanying drawings, wherein.

Figure 1:
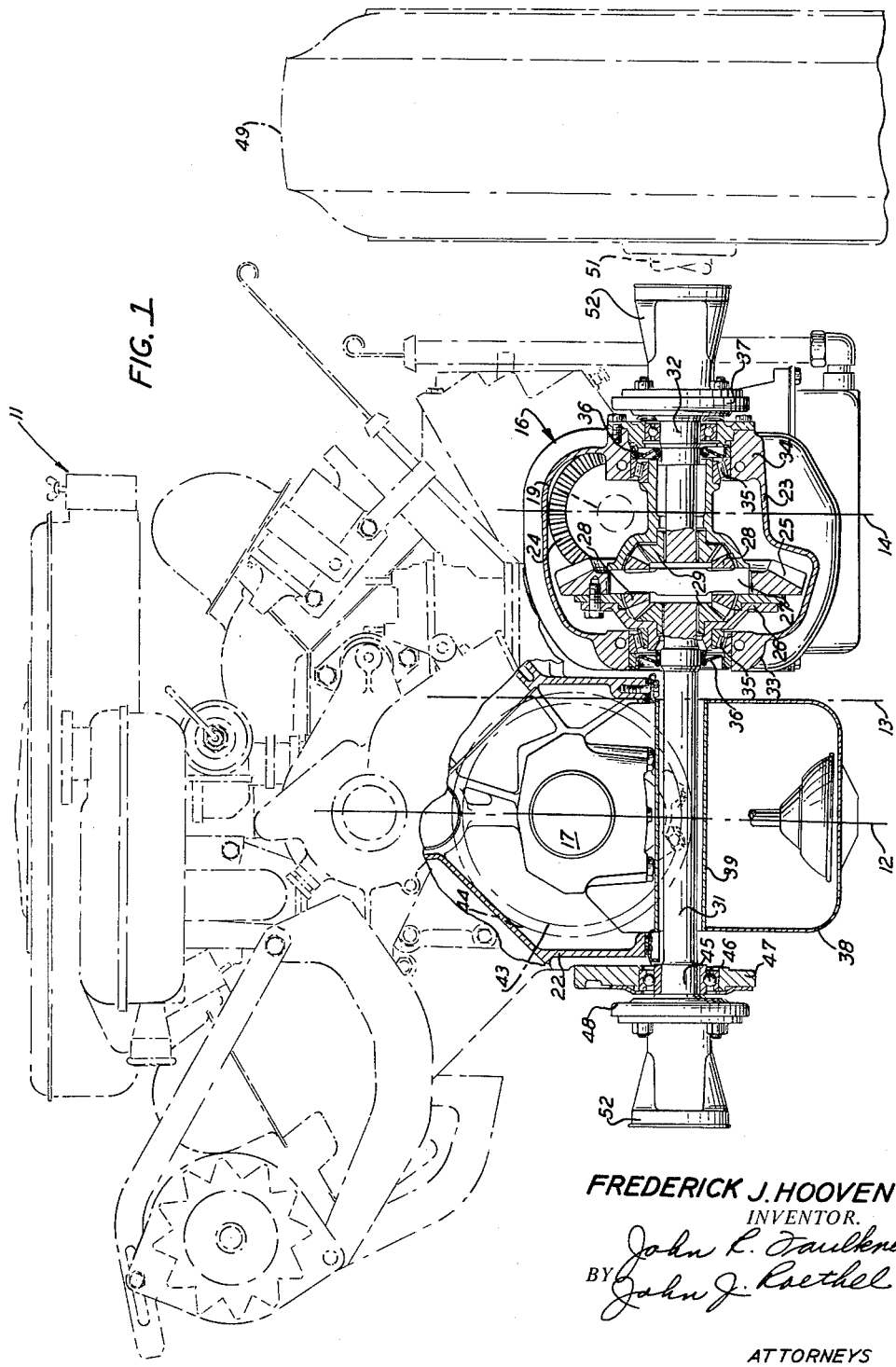
FIG. 1 is a front elevational view of the engine with certain parts broken away and with some of the conventional engine components shown in dot-dash outline.
Figure 2:
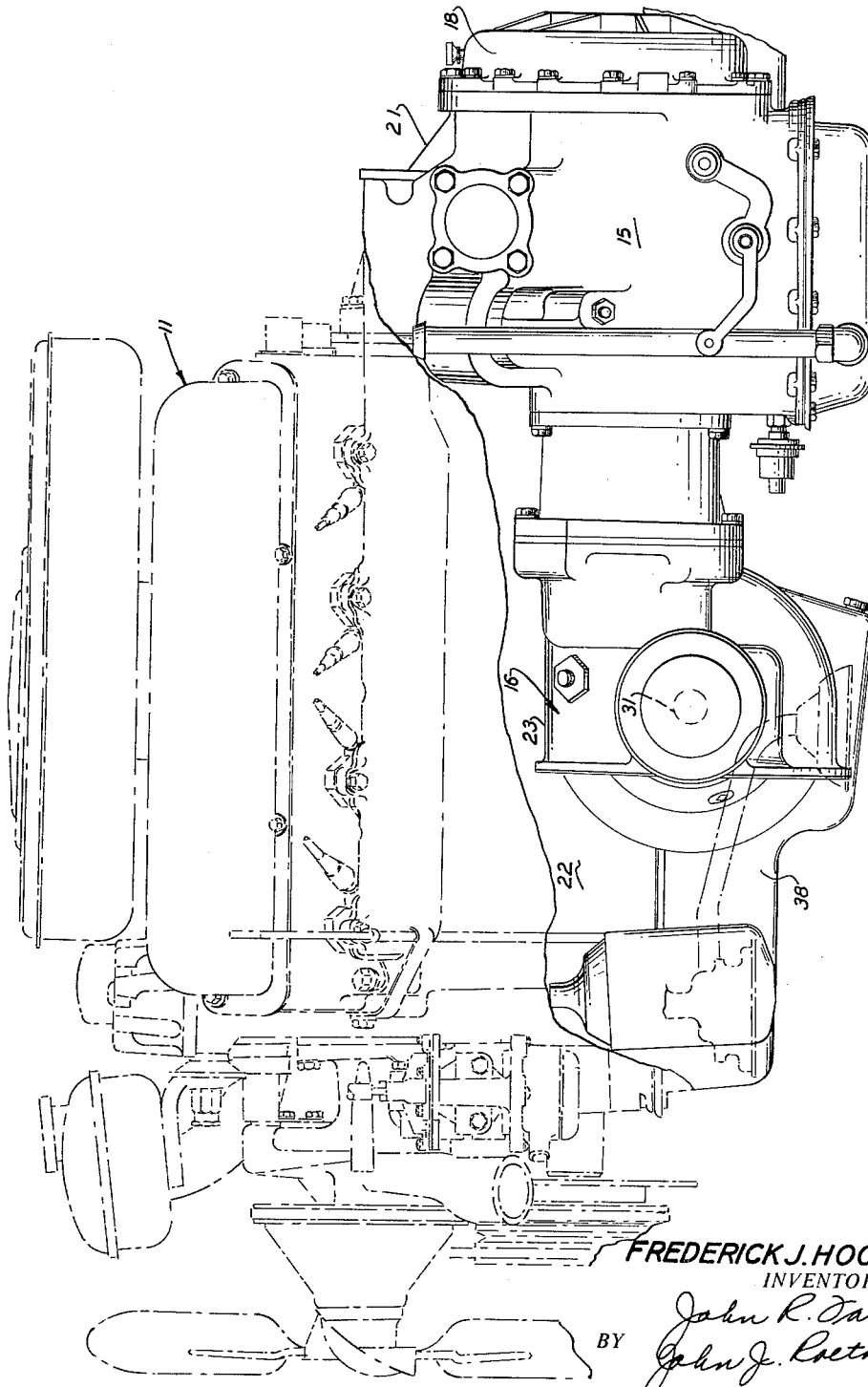
FIG. 2 is a side elevational view of the engine embodying the present invention with the conventional portions of the engine shown in dot-dash outline.

Referring now to the drawings, there is illustrated a conventional automotive engine of the V-8 type, generally designated 11. The engine is illustrated in dot and dash outline since, in general, the details of its construction form no direct part of the present invention. In a conventional engine installation, the engine would be mounted within the engine compartment so that the longitudinally extending vertical plane containing the center line of the engine, represented by the line 12 would coincide with the longitudinally extending vertical plane containing the center line 13 of the engine compartment and, therefore, of the vehicle body (see FIG. 1). In a conventional engine installation, the vehicle transmission would be bolted to the rear of the engine block and the longitudinally extending vertical plane containing the center line 14 of the transmission would be in alignment with the longitudinally extending vertical plane containing the center line of the engine.

Since it is desired to make the power unit embodied herein as compact as possible, the present invention involves certain deviations from the foregoing conventional practice. The first of these is in the location of the transmission, generally designated 15, and the differential, generally designated 16, for transmitting power from the engine to the driven wheels, which in the present case are the front wheels.

In the illustrated embodiment of the invention, the differential 16 and transmission 15 are mounted on the right side of the engine, as viewed facing the front of the vehicle as in FIG. 1. Power is transmitted from the engine crankshaft 17 to the transmission 15 through a transfer drive unit 18. The transfer drive unit 18 is not illustrated in any specific form since it may take any one of several forms. It merely comprises a means for transmitting rotary motion from the engine crankshaft 17 to the differential input shaft 19, the two shafts being in parallelism to each other. In its preferred form the transfer drive unit 18 might comprise a chain drive, the basic components of which are shown in U.S. Patent 2,008,724.

The transmission housing 21 may be bolted or integrally cast to the engine block 22. The transmission 15 is preferably of the automatic type embodying a torque converter and gear unit with control means for effecting an automatic shift from one gear ratio to another. The output shaft (not shown) of the transmission is coupled to the input shaft 19 of the differential unit. It will be noted that the longitudinally extending vertical plane containing the center line 14 of the differential 16 and the tranmission 15 lie to the right of the center line 13 of the longitudinally extending vertical plane containing the compartment, as viewed in FIG. 1. The differential casing 23 is also bolted or conveniently secured to one side of the engine block 22. Clearly shown in FIG. 1 is the beveled pinion 24 within the differential casing 23. The teeth of the pinion 24 are inmeshed with the teeth of ring gear 25 so that the rotary motion of the differential input shaft 19 is transmitted to the ring gear. The differential is a conventional unit in that the ring gear 25 is mounted externally of a spider body 26 having mounted therein a diametrically extending pinion shaft 27. Freely rotatable on the pinion shaft 27 are the beveled pinions 28 which are in mesh with similar beveled pinions 29 directly mounted on the splined ends of shafts 31 and 32, respectively. The casing portions 33 and 34 of the differential are equipped with bearings 35 for the spider body, and these bearings also serve through the hub extensions of the spider body and through the hubs of the beveled pinions for the support of the inner ends of the shafts 31 and 32. The shaft 31 may hereinafter be referred to as the cross shaft. Suitable oil seal devices 36 are provided to retain the oil within the differential. The shaft 32 is relatively short and terminates in a hub or flange 37.

Figure 3:
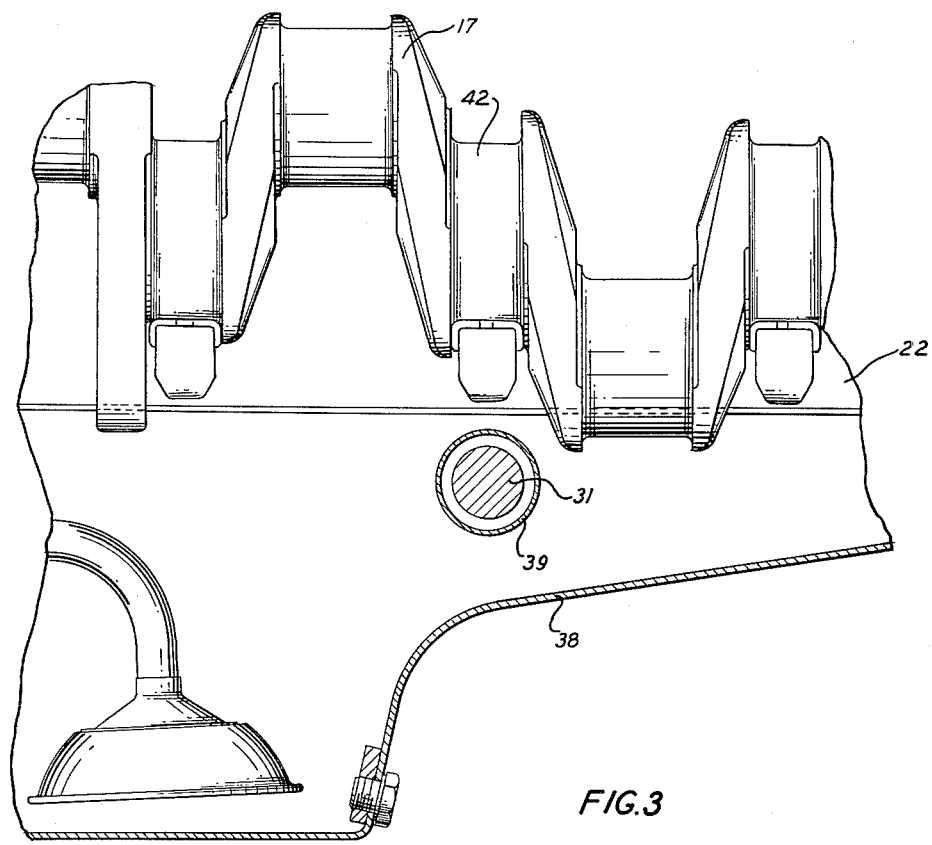
FIG. 3 is a fragmentary view illustrating the relationship of the cross shaft to the crankshaft of the engine.
Figure 4:
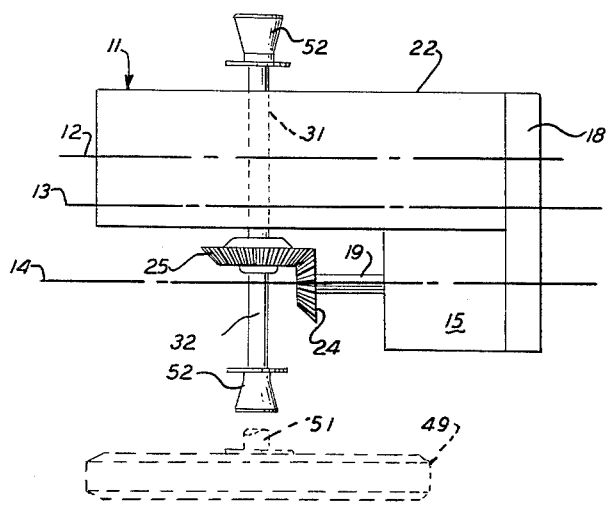
FIG. 4 is a diagrammatic view of the complete power unit assembly, including the relationship to the driving wheels.

The cross shaft 31 represents an important feature of the present invention. In effect, the shaft 31 projects through the engine block 22, or at least through the upper portion of the oil pan 38. As illustrated in FIG. 1, the oil pan is provided with a tubular shaft receiving member 39 extending laterally from one side to the other. The relationship of the tubular member 39 housing the cross shaft 31 is clearly indicated in FIGS. 1 and 3. It will be noted that the tubular member 39 and therefore the cross shaft 31 within the tubular member are mounted under one of the main bearings 42 of the engine. The location is beneath a main bearing located near the longitudinal weight center of the engine so that the engine will be balanced, or substantially so, above the wheels.

A second feature to be noted is the close proximity of the tubular member 39 and therefore the cross shaft 31 to the crankshaft 17. In FIG. 1, there are shown two dot and dash outline circles. The circle 43 represents the maximum path of the connecting rods and the circle 44 represents the maximum path of the counterweights. It will be noted that both of these paths sweep below the top level of the tubular member 39 and of the cross shaft 31. Through the foregoing construction and arrangement the present invention provides a front drive power unit having substantially no difference in vertical height over a conventional power plant. In this connection it should be noted that the center of the differential input shaft 19 is interposed between horizontal planes passing through the center of the crankshaft 17 and including the longitudinal axis of the cross shaft 31, respectively. It will be further noted that the bottom of the transmission is substantially in alignment with the bottom of the oil pan 38 on the engine.

The outboard end 45 of the cross shaft 31 is journaled in a suitable bearing 46 held in a bearing retainer 47 mounted on the right side of the engine block 22, facing the engine from the driver seat. The cross shaft 31 outboard of its bearing support is provided with a hub or flange 48. The wheels 49 of the vehicle, only one of which is shown, are driven by independently suspended half shafts 51. In FIG. 1 the wheel 49 has been moved in toward the engine for compactness of representation, but it will be understood that the shaft 51 of such length is to permit the wheel 49 to be placed far enough away from the power unit to permit the necessary movements of suspension deflection and steering. The shafts have Cardan joints at the inboard ends, one element 52 of which is shown bolted or secured to each hub 37 and 48, respectively. The outboard ends of the half shafts are connected to the wheels by suitable universal joints (not shown), preferably of constant velocity design, to permit the transmission of power to the wheel from the power unit while accommodating the necessary movement of the wheel relative to the power unit.

The present invention is not directly concerned with the nature of the independent suspension of the half shafts or the linkage for steering the vehicle. Accordingly, it is believed that the foregoing brief description of these components will suffice for an understanding of the invention.

It will be understood that the invention is not to be limited to the exact construction shown and described, but that various changes and modifications may be made without departing from the spirit and scope of the invention, as defined in the appended claims.

What is claimed is:

1. In a vehicular power unit mounted within the engine compartment of a motor vehicle; an engine comprising an engine block, a crankshaft, and spaced bearing means at the ends and intermediate the ends of said crankshaft rotatably supporting the latter within said engine block; the longitudinally extending vertical plane containing the center line of said engine being displaced to one side of the longitudinally extending vertical center plane of said engine compartment; a transmission means; a differential unit; means longitudinally aligning and supporting said transmission means and differential unit on one side of said engine block; the longitudinally extending vertical plane containing the center line of said transmission means and differential unit being displaced to the other side of said engine compartment longitudinally extending vertical center plane; the bottom of said transmission means being substantially at the same level as the bottom of said engine; a transfer drive unit mounted at the rear of said engine block rotatably coupling said crankshaft to said transmission means; and a cross shaft extending from said differential unit through said engine block in proximity to one of said spaced bearing means to transmit power to a vehicle driving wheel, the last named bearing means beneath which said cross shaft passes being an intermediate one located near the longitudinal weight center of said power unit, said cross shaft having at least a portion of its diametral cross section intersecting the projected area of the sweep of the crank arms of said crankshaft as the latter is rotated.

2. A vehicle power unit comprising an engine having its crackshaft mounted with its axis of rotation parallel to the longitudinally extending vertical plane containing the center line of the vehicle, driving wheels mounted along a transverse axis intermediate the ends of said crankshaft, a transmission system mounted along an axis parallel to that of said crankshaft and laterally displaced therefrom, a transfer drive effective to transmit rotary motion from the axis of said crankshaft to the axis of said transmission system, a differential unit mounted on said engine having differential means substantially coaxial with said driving wheels and disposed on the same side of said crankshaft axis as said transmission system, gear means effective to transmit rotary motion from the axis of said transmission system to the axis of said differential means, jointed shafts having outer ends connected to said driving wheels extending inward toward said engine along a line substantially coincident with the axis of said driving wheels, bearing means carried upon said engine coaxial with bearing means carried upon said differential unit at points corresponding to the inner ends of said jointed shafts, and cross shafts carried in said bearing means connecting said differential means to said jointed shafts, one of said cross shafts extending transversely through said engine adjacent to the longitudinal center of said crankshaft.

3. A vehicle power unit having the vehicle driving wheels in juxtaposition thereto, comprising, in combination, an engine having a longitudinally extending crankshaft, spaced bearing means supporting said crankshaft at each end and intermediate the ends thereof, a transmission means mounted on one side of said engine, transfer means extending across one end of said engine and the corresponding end of said transmission means operatively coupling said engine to the latter, a differential unit mounted at said one side of said engine having its input shaft coupled to said transmission means, said input shaft being laterally displaced from and parallel to said crankshaft, and aligned driven shafts extending in opposite directions from said differential unit transversely of said crankshaft and coupled to said driving wheels, one of said driven shafts projecting through said engine adjacent said crankshaft beneath one of said intermediate bearing means, the axis of rotation of said input shaft lying in a horizontal plane interposed between horizontal planes passing through the axes of rotation of said crankshaft and driven shafts, respectively, said one driven shaft having at least a portion thereof lying within the projected area of the sweep of the crank arms of said crankshaft as the latter rotates.

4. A vehicle power unit comprising an engine having its crankshaft mounted with its axis of rotation parallel to the longitudinally extending vertical plane containing the center line of the vehicle, driving wheels mounted along a transverse axis intermediate the ends of said crankshaft, a transmission system mounted along an axis parallel to that of said crankshaft and laterally displaced therefrom, a transfer drive effective to transmit rotary motion from the axis of said crankshaft to the axis of said transmission system, a differential unit mounted on said engine having differential means substantially coaxial with said driving wheels and disposed on the same side of said crankshaft axis as said transmission system, gear means effective to transmit rotary motion from the axis of said transmission system to the axis of said differential means, jointed shafts having outer ends connected to said driving wheels extending inward toward said engine along a line substantially coincident with the axis of said driving wheels, bearing means carried upon said engine coaxial with bearing means carried upon said differential unit at points corresponding to the inner ends of said jointed shafts, and cross shafts carried in said bearing means connecting said differential means to said jointed shafts, one of said cross shafts extending transversely through said engine, said one cross shaft having at least a portion thereof lying within the projected area of the sweep of the crank arms of said crankshaft as the latter rotates.

References Cited in the file of this patent

UNITED STATES PATENTS

| | | |
|---|---|---|
| 1,855,642 | Masury | Apr. 26, 1932 |
| 1,880,270 | Noble | Oct. 4, 1932 |
| 2,008,724 | Muller | July 23, 1935 |
| 2,078,034 | Smith | Apr. 20, 1937 |
| 2,714,936 | Gregory | Aug. 9, 1955 |

FOREIGN PATENTS

| | | |
|---|---|---|
| 459,247 | Germany | Apr. 30, 1928 |
| 652,422 | Great Britain | Apr. 25, 1951 |